United States Patent Office.

CHARLES STETEFELDT, OF AUSTIN, NEVADA.

*Letters Patent No.* 72,931, *dated December* 31, 1867; *reissue No.* 3,808, *dated January* 25, 1870.

DIVISION B.

IMPROVED PROCESS OF TREATING SILVER-ORES.

The Schedule referred to in these Letters Patent and making part of the same

*To all whom it may concern:*

Be it known that I, CHARLES STETEFELDT, of Austin, in the county of Lander, and State of Nevada, have invented a certain new and improved Process of Chlorodizing Silver-Ores; and I do hereby declare the following to be a full, clear, and exact description of the same, which will enable any person skilled in the art to which it appertains, to practise my invention.

The nature of my invention consists in dropping a mixture of pulverized silver-ore and salt, through a vertical, or nearly vertical shaft, through which the products of combustion are ascending, whereby an almost instantaneous chlorination of the silver is effected.

I take any silver-ore, and mix it with from four to eight per cent. of its weight of common salt, more or less, according to the richness of the ore, (a rich ore, as is well known, requiring a greater proportion of salt than a poor ore,) after which I pulverize the mixture to the degree of fineness commonly required to prepare ore for amalgamation.

In order to accomplish an intimate mixture of the ore and salt, I prefer to crush them together in a dry-crushing battery. I then introduce this mixture into the top of a furnace, the shaft of which is vertical, or nearly so, and which is heated by fire-places at or near the bottom, so that a current of heated air, gases, and other products of combustion, is continually ascending through the shaft.

Care must be taken to introduce the mixture so that it shall fall in separate and finely-divided particles, and not in lumps.

As the pulverized mixture falls through the current which rises from the fire, the ore and salt are both instantly decomposed, the action of the heat separating the silver from the sulphur, antimony, or other substances combined or mixed with it, and the salt being also at the same time decomposed by the gases which are formed by the decomposition of the ore.

The chlorine of the salt then instantly unites with the silver, so that the chlorination of the silver is completed in less than two seconds. I do not confine myself to the exact proportions of ore and salt given above, as they are not essential to my process, but I state those proportions which I have found to be most advantageous in practice.

What I claim as new, and desire to secure by Letters Patent of the United States, is—

The process of chloridizing silver-ore by dropping a mixture of pulverized ore and salt through a vertical, or nearly vertical shaft, through which the products of combustion are ascending.

CHARLES STETEFELDT.

Witnesses:
WM. R. WRIGHT,
WM. J. BURNS.